US009732644B2

(12) United States Patent
Kim et al.

(10) Patent No.: US 9,732,644 B2
(45) Date of Patent: Aug. 15, 2017

(54) VALVE FOR A VEHICLE

(71) Applicants: Hyundai Motor Company, Seoul (KR); Inzicontrols Co., Ltd., Siheung-si (KR)

(72) Inventors: Jaeyeon Kim, Hwaseong-Si (KR); Sangyong Rhee, Samcheok-si (KR); Jichul Lee, Hwaseong-si (KR)

(73) Assignees: HYUNDAI MOTOR COMPANY, Seoul (KR); INZICONTROLS CO., LTD., Siheung-si (KR)

( * ) Notice: Subject to any disclaimer, the term of this patent is extended or adjusted under 35 U.S.C. 154(b) by 235 days.

(21) Appl. No.: 14/562,415

(22) Filed: Dec. 5, 2014

(65) Prior Publication Data
US 2015/0315941 A1    Nov. 5, 2015

(30) Foreign Application Priority Data
Apr. 30, 2014    (KR) ........................ 10-2014-0052375

(51) Int. Cl.
*F01M 5/00*    (2006.01)
*F16K 3/02*    (2006.01)
(Continued)

(52) U.S. Cl.
CPC .......... *F01M 5/007* (2013.01); *F16K 3/0218* (2013.01); *F16K 3/314* (2013.01); *F16K 11/04* (2013.01);
(Continued)

(58) Field of Classification Search
CPC ....... F01M 5/007; F16K 3/0218; F16K 3/314; F16K 21/04; F16K 11/04;
(Continued)

(56) References Cited

U.S. PATENT DOCUMENTS 2,400,615 A * 5/1946 Warrick ................. F01M 5/007
236/34.5
4,027,643 A   6/1977 Feenan et al.
(Continued)

FOREIGN PATENT DOCUMENTS

JP    11-201265 A    7/1999
JP    2004-232514 A    8/2004
(Continued)

*Primary Examiner* — Ryan J Walters
*Assistant Examiner* — Schyler S Sanks
(74) *Attorney, Agent, or Firm* — Morgan Lewis & Bockius LLP

(57) ABSTRACT

A valve for a vehicle provided between a transmission and an oil cooler for cooling transmission oil may include a valve housing in which a first inflow port connected to the transmission and an exhaust port connected to the oil cooler are formed on both sides facing each other and a bypass port connected to the transmission and a second inflow port connected to the oil cooler are formed at a position spaced apart from the first inflow port and the exhaust port along a length direction of the valve housing, and a control unit that is mounted inside the valve housing selectively connects the first inflow port to the exhaust port or the bypass port while expansion or contraction is performed depending on a temperature of the transmission oil, and selectively closes the exhaust port to control a flow stream of the transmission oil.

19 Claims, 9 Drawing Sheets

(51) Int. Cl.
*F16K 3/314* (2006.01)
*F16K 15/18* (2006.01)
*F16K 21/04* (2006.01)
*F16K 31/00* (2006.01)
*G05D 23/02* (2006.01)
*F16K 11/04* (2006.01)
*F16H 57/04* (2010.01)

(52) U.S. Cl.
CPC .............. *F16K 15/18* (2013.01); *F16K 21/04* (2013.01); *F16K 31/002* (2013.01); *G05D 23/022* (2013.01); *F16H 57/04* (2013.01)

(58) Field of Classification Search
CPC .... Y10T 137/86702; Y10T 137/86638; G05D 23/022; G05D 23/1333; F01P 7/16
USPC ............. 137/625.68, 625.21; 236/96 R, 34.5
See application file for complete search history.

(56) References Cited

U.S. PATENT DOCUMENTS

| | | | |
|---|---|---|---|
| 6,253,837 B1 | 7/2001 | Seiler et al. | |
| 6,962,295 B2* | 11/2005 | Ieda | F16H 57/0413 137/334 |
| 7,721,973 B2* | 5/2010 | Peric | F01P 7/14 137/625.49 |
| 2013/0048741 A1* | 2/2013 | Borgia | G05D 23/1333 236/34.5 |

FOREIGN PATENT DOCUMENTS

| | | |
|---|---|---|
| JP | 2008-116004 A | 5/2008 |
| JP | 2010-203598 A | 9/2010 |
| KR | 10-2001-0030940 A | 4/2001 |
| KR | 10-2012-0039008 | 4/2012 |

* cited by examiner (S1)

(S2)

(S10)

(S20)

VALVE FOR A VEHICLE

CROSS-REFERENCE TO RELATED APPLICATION

The present application claims priority of Korean Patent Application Number 10-2014-0052375 filed on Apr. 30, 2014, the entire contents of which are incorporated herein for all purposes by this reference.

BACKGROUND OF THE INVENTION

Field of the Invention

The present invention relates to a valve for a vehicle, and more particularly, to a valve for a vehicle that is provided between an oil cooler and a transmission to prevent a decrease in temperature of the transmission oil by allowing the transmission oil to bypass to the transmission depending on the temperature of the transmission oil, or supplies the transmission with the transmission oil cooled by inflow to the oil cooler.

Description of the Related Art

In general, a valve is a device that is installed in a pipeline or in a container to allow inflow of a fluid including a gas such as air and a liquid such as water, and exhausts the inflow fluid to the outside or blocks the exhaust to control a flow rate and a pressure of the fluid.

Typically, such a valve is configured to be able to control the flow of a fluid by manipulating a valve seat through which fluid passes using a valve stem and a handle, or to be able to perform remote adjustment by detecting the temperature of the fluid flowing through the valve seat using a separate temperature control device.

Meanwhile, in recent years, the valve capable of being controlled depending on the temperature as described above has been applied to the cooling apparatus for cooling the transmission oil.

The conventional transmission oil cooling apparatus is divided into an air-cooling type and a water-cooling type, in order to prevent an excessive temperature rise due to slip of transmission components by keeping the temperature of the transmission oil at a predetermined temperature, and simultaneously in order to prevent an increase in friction loss of the transmission due to an increase in oil viscosity and a resultant deterioration of fuel efficiency, at the time of excessive cooling of the transmission oil.

Among them, an air-cooled transmission oil cooling apparatus includes an oil cooler provided at a location such as a front of a radiator at which the outside air smoothly flows, and a bypass valve that is installed in a pipe between the oil cooler and the transmission to be opened and closed depending on the temperature of the transmission oil. Thus, when the temperature of the oil is higher than the predetermined temperature, the transmission oil is caused to pass through the heat exchanger via the bypass valve, and when the temperature of oil is lower than the predetermined temperature, the transmission oil is not allowed to pass through the heat exchanger, thereby keeping the transmission oil at the predetermined temperature.

However, in the bypass valve to be applied to the conventional transmission oil cooling apparatus as described above, since each of the constituent elements needs to be sequentially fitted and assembled to a valve mounting hole of a valve housing, there are drawbacks in which it is difficult to precisely position each of the constituent elements, excessive assembling time is required, and the manufacturing cost increases.

Furthermore, the bypass valve applied to the transmission oil cooling apparatus also has a drawback in which, when cooling of the transmission oil is not required, since a part of the low-temperature transmission oil cooled from the oil cooler flows into the bypass valve from the transmission and then flows into the transmission, together with the bypassed transmission oil in a high-temperature state, the rapid warming of the transmission oil is difficult.

In addition, since the conventional bypass valve is located in the flow passage pipe that connects the transmission and the oil cooler, and a relatively large bypass valve is located in the pipe, there is also a drawback in which spatial utility of an engine compartment is degraded.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a valve for a vehicle that is provided between the oil cooler for cooling the transmission oil and the transmission in a simple structure, and by controlling the flow stream of the transmission oil so as to allow the transmission oil to rapidly bypass or to flow into the oil cooler depending on the temperature of the transmission oil, achieves the simple assembly through simplification of the constituent elements, can reduce manufacturing cost, and increases the flow rate by securing the bypass flow passage as compared to the related art.

Various aspects of the present invention provide a valve for a vehicle provided between a transmission and an oil cooler for cooling transmission oil, including: a valve housing in which, on both sides facing each other, a first inflow port connected to the transmission and an exhaust port connected to the oil cooler are formed, and on the both sides facing each other at a position spaced apart from the first inflow port and the exhaust port along a length direction of the valve housing, a bypass port connected to the transmission and a second inflow port connected to the oil cooler are formed; and a control unit that is mounted inside the valve housing, selectively connects the first inflow port to the exhaust port or the bypass port while expansion or contraction is performed depending on a temperature of the transmission oil, and selectively closes the exhaust port to control a flow stream of the transmission oil.

One end of the valve housing may be closed and the other end thereof may be open, and a mounting space connected to the first and second inflow ports, the exhaust port, and the bypass port may be formed therein.

The first inflow port may be formed on one side of the valve housing at a position diagonal to the second inflow port formed on the other side of the valve housing.

The control unit may include: a sliding member in which one end is open and a mounting part is formed at a center portion of the other end, at least one first opening hole is formed on one side corresponding to the first inflow port and the bypass port along a length direction of the sliding member, and at least one second opening hole is formed on the other side corresponding to the second inflow port and the exhaust port along the length direction of the sliding member, and which is inserted to be slidable inside the valve housing; an end cap that is mounted to the open other end of the valve housing, closes an interior of the valve housing, and is formed with a fixing groove at a center portion of the end cap; a deformable member that is inserted into the mounting part of the sliding member, and selectively raises or lowers the sliding member, while ascending or descending on the fixing rod in a state in which the expansion or contraction is performed inside depending on the temperature of the transmission oil; a fixing rod, one end of which is fixed to the fixing groove of the end cap, and the other end of which is inserted into a bottom of the deformable member; and a first elastic member that is interposed between the sliding member inside the valve housing and that applies elastic force to the sliding member, while being compressed or pulled depending on the expansion or contraction of the deformable member.

The sliding member may be formed in a cylindrical shape that is open at one end.

The first opening hole and the second opening hole may be separately formed at the top and bottom in the length direction of the sliding member, respectively, and in the first and second opening holes positioned at the top, the size of the first opening hole may be formed to be greater than the size of the second opening hole.

When the deformable member is not deformed, the plurality of the first opening holes may be positioned in accordance with the first inflow port and the bypass port, the second opening hole formed at the upper portion of the sliding member may be positioned below the exhaust port, and a second opening hole formed at the lower portion of the sliding member may be positioned in accordance with the second inflow port.

At a time of expansion deformation of the deformable member, the sliding member may ascend inside the valve housing and maintain the bypass port and the second inflow port in an open state, and the first and second opening holes formed at the upper portion of the sliding member may be positioned in accordance with the first inflow port and the exhaust port to open the first inflow port and the exhaust port.

The sliding member may be fixed to the deformable member through a fixing ring mounted between the mounting part and the deformable member before the deformable member is inserted to the mounting part.

The end cap may be fixed to the valve housing through a mounting ring fixedly mounted to an interior circumferential surface of the opened other end of the valve housing.

The mounting ring may be fixedly mounted through a ring groove formed along a periphery of the interior circumferential surface of the open other end of the valve housing.

A seal ring that prevents the transmission oil flowing into the valve housing from leaking to an outside of the valve housing may be mounted between the valve housing and the end cap.

The first elastic member may be formed of a coil spring, one end of which is supported on an inner side of the closed one end of the valve housing, and the other end of which is supported on an inner side of the other end of the sliding member.

The valve housing may be formed with a support groove, in which the first elastic member is fixed in a supported state, on an inner side of the one end of the valve housing.

The sliding member may be formed with at least one relief hole that is formed at a position spaced apart from the mounting part at the other end in which the mounting part is formed. The at least one relief hole may include a plurality of relief holes that are formed at positions spaced apart from each other at a predetermined angle along a circumferential direction around the mounting part.

Between the sliding member and the deformable member, a pressure control unit which selectively opens or closes the at least one relief hole, when a differential pressure occurs by the transmission oil flowed inside the valve housing.

The pressure control unit may include: an opening and closing member that is disposed inside the other end of the sliding member to correspond to the at least one relief hole; and a second elastic member that is interposed between the opening and closing member and the deformable member inside the sliding member, and applies elastic force to the opening and closing member.

The opening and closing member may be formed in a disk shape having a penetration hole formed at a center portion to correspond to the mounting part.

The opening and closing member may be integrally formed with a protrusion that protrudes toward the second elastic member from an interior circumferential surface of the penetration hole.

The second elastic member may be formed by a coil spring, one end of which is supported of the deformable member, and the other end of which is supported by the opening and closing member.

The deformable member may include a wax material that contracts and expands inside depending on the temperature of the transmission oil.

As disclosed herein, in accordance with a valve for a vehicle according to various aspects of the present invention, by controlling the flow stream of transmission oil to allow the transmission oil to bypass or flow into the oil cooler, while rapidly expanding or contracting depending on the temperature of the transmission oil by being provided between the oil cooler for cooling the transmission oil and the transmission in a simple structure, there is an effect of achieving convenient manufacturing and assembling, and reducing manufacturing cost through simplification of the constituent elements.

Furthermore, there are effects in which the flow rate can be increased by securing the bypass flow passage compared to the related art, by preventing the transmission oil cooled by the oil cooler from leaking to the transmission in advance, reliability of the flow stream control according to the temperature of the transmission oil can be secured, and by reducing the friction loss inside the transmission through the rapid warming of the transmission oil, the overall fuel consumption efficiency of the vehicle is improved.

In addition, there are effects in which, during bypass of the transmission oil, the required power of the hydraulic pump can be reduced through the increase of flow rate, by assembling the internal constituent elements to the valve housing later, and since the internal components can be replaced after breakdown, the maintenance costs are reduced and the convenience of replacement work is improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF THE EMBODIMENTS

Figure 1:
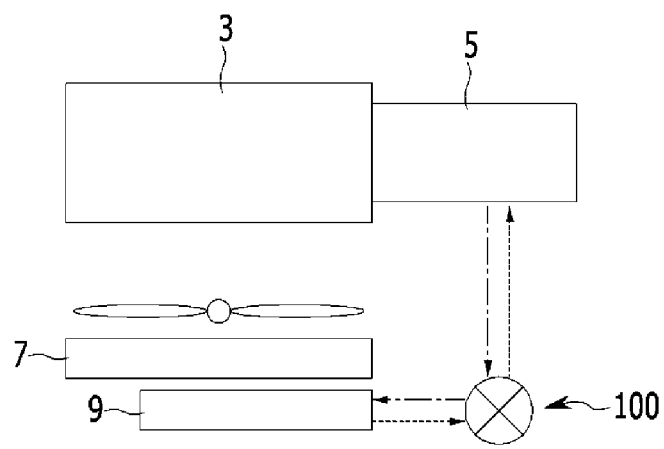
FIG. 1 is a block diagram of a transmission oil cooling apparatus to which an exemplary valve for a vehicle according to the present invention is applied.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In order to clearly describe the present invention, parts irrelevant to the description are omitted, and identical or similar constituent elements throughout the specification are denoted by the same reference numerals.

Since the size and thickness of each configuration shown in the drawings are shown for convenience of description, the present invention is not necessarily limited to configurations illustrated in the drawings, and in order to clearly illustrate several parts and areas, the enlarged thicknesses are shown.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

Figure 2:
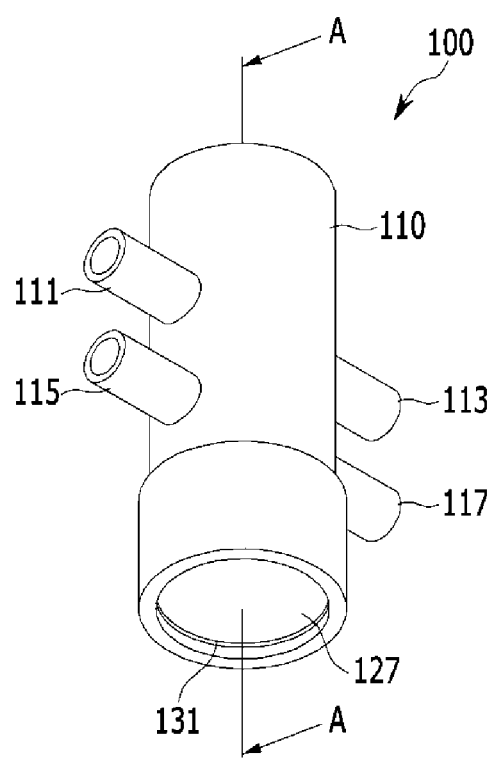
FIG. 2 is a perspective view of an exemplary valve for a vehicle according to the present invention.
Figure 3:
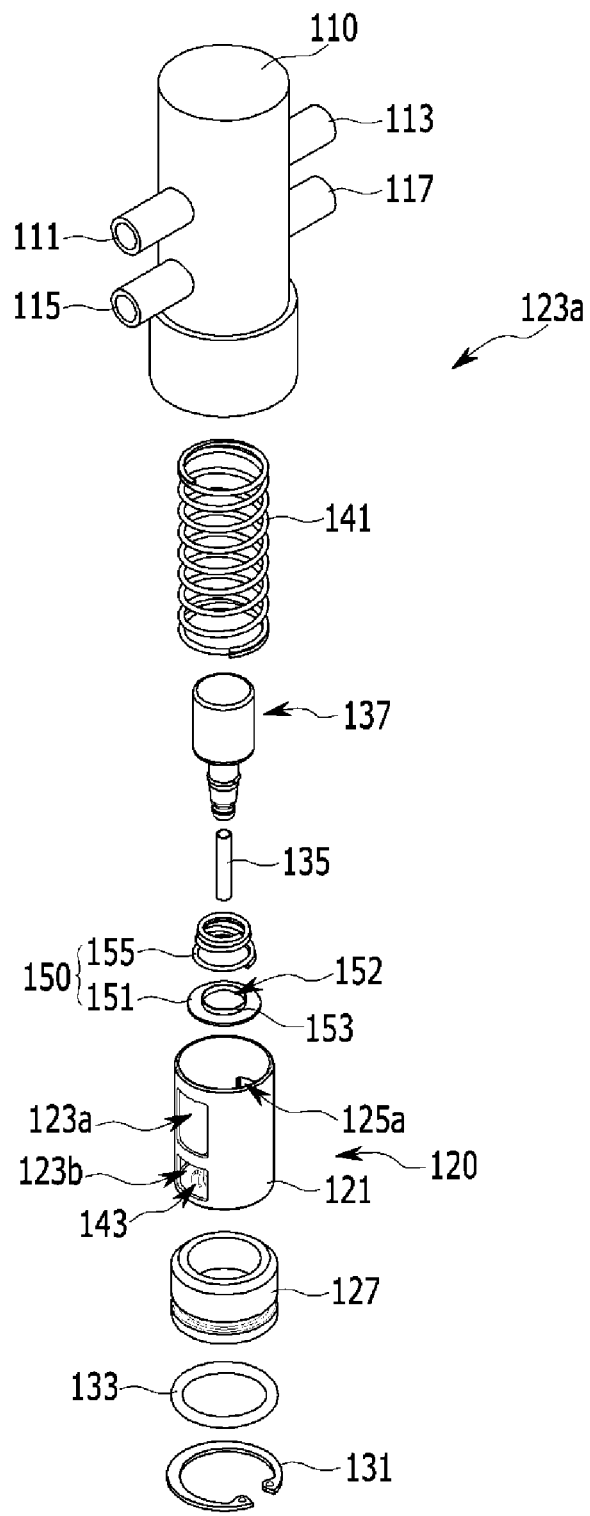
FIG. 3 is an exploded perspective view of an exemplary valve for a vehicle according to the present invention.
Figure 4A:
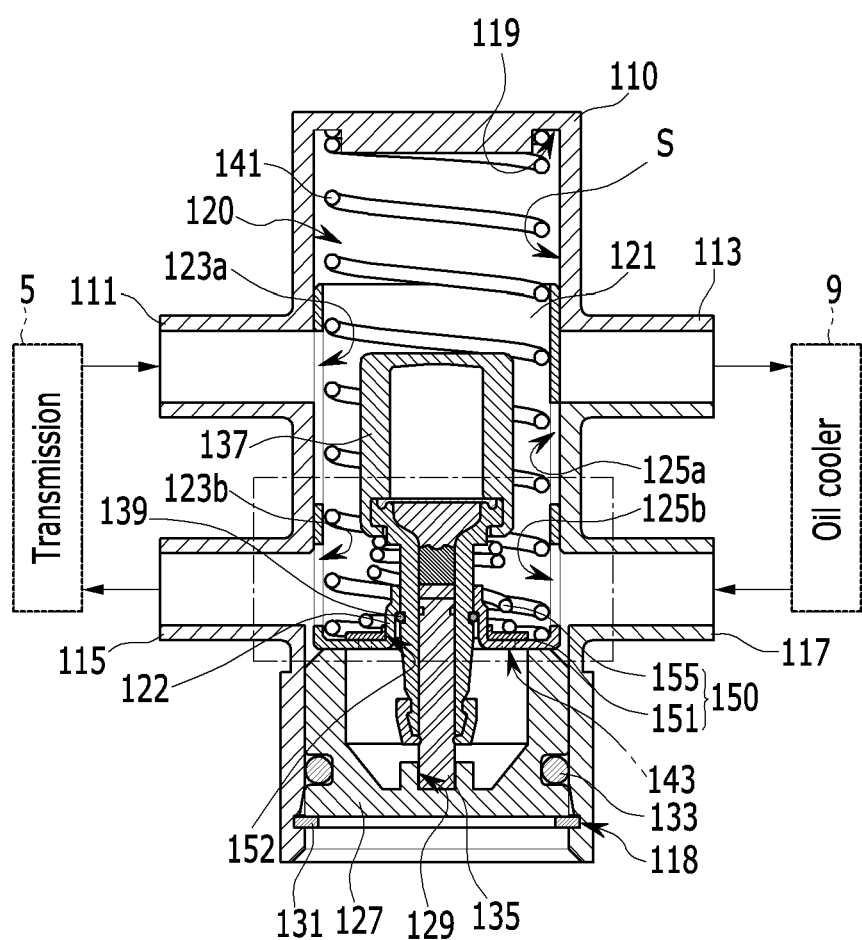
FIG. 4A is a cross-sectional view taken along line A-A of FIG. 2.
Figure 4B:
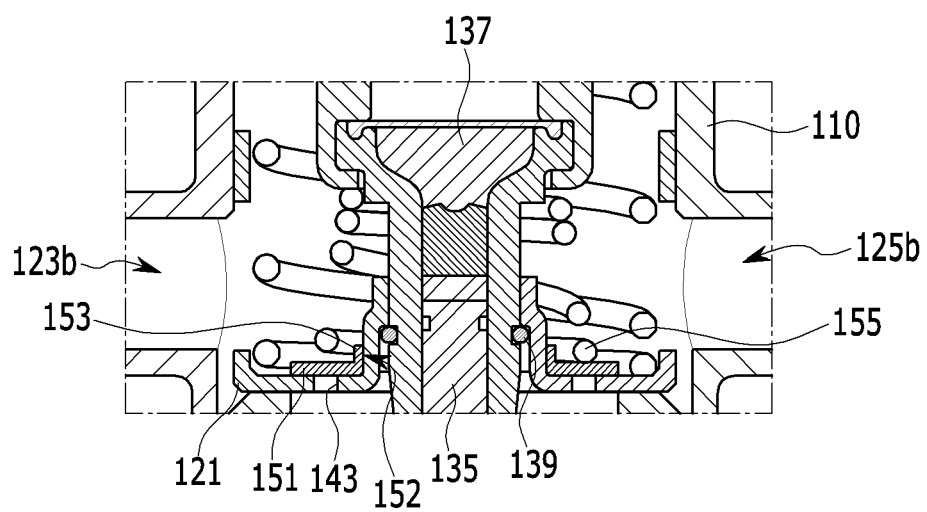
FIG. 4B is a partially enlarged view of FIG. 4A.

FIG. 1 is a block diagram of a transmission oil cooling apparatus to which a valve for a vehicle according to various embodiments of the present invention is applied, FIG. 2 is a perspective view of the valve for a vehicle according to various embodiments of the present invention, FIG. 3 is an exploded perspective view of the valve for a vehicle according to various embodiments of the present invention, and FIG. 4A is a cross-sectional view taken along line A-A of FIG. 2. FIG. 4B is a partially enlarged view of FIG. 4A.

As shown in FIG. 1 to FIG. 4B, the valve 100 for a vehicle according to various embodiments of the present invention controls the flow stream of the transmission oil so as to cause the transmission oil to rapidly bypass or to flow into an oil cooler 9 depending on the temperature of the transmission oil, thereby achieving the simple assembly through simplification of the constituent elements, being able to reduce the manufacturing costs, and increasing the flow rate, by securing the bypass flow passage compared to the related art.

To this end, as shown in FIG. 1, the valve 100 for a vehicle according to various embodiments of the present invention is provided between a transmission 5 and the oil cooler 9. If the transmission oil filled in the transmission 5 mounted on one side of an engine 3 is overheated, the oil cooler 9 disposed on one side of a radiator 7 cools the transmission oil through heat exchange with the flowing outside air while traveling.

As shown in FIG. 2 to FIG. 4B, the valve 100 for a vehicle includes a valve housing 110 and a control unit 120.

First, on both sides corresponding to each other, the valve housing 110 is provided with a first inflow port 111 which is connected to the transmission 5 and into which the transmission oil flows, and an exhaust port 113 connected to the oil cooler 9.

Furthermore, the valve housing 110 is formed with a bypass port 115 connected to the transmission 5, and a second inflow port 117 connected to the oil cooler 9, on both sides corresponding to each other at a position separated downward from the first inflow port 111 and the exhaust port 113 along the length direction.

That is, the first inflow port 111 is formed on an upper one side of the valve housing 110 and is connected to the transmission 5, and the exhaust port 113 is formed on the upper other side of the valve housing 110 at the position corresponding to the first inflow port 111 and is connected to the oil cooler 9.

Moreover, the bypass port 115 is formed on the lower one side of the valve housing 110 spaced apart from the first inflow port 113 and is connected to the transmission 5, and the second inflow port 117 is formed on the lower other side of the valve housing 110 at a position corresponding to the bypass port 115, and the transmission oil cooled from the oil cooler 9 flows into the second inflow port 117.

Here, the valve housing 110 is closed at one end and is open at the other end, a mounting space S connected to the first and second inflow ports 111 and 117, the exhaust port 113, and the bypass port 115 can be formed inside the valve housing 110, and the transmission oil flows into the mounting space S from the transmission 5 or the oil cooler 9.

The first inflow port 111 can be formed at a position intersecting with the second inflow port 117 at the top and bottom (or upper and lower portions) of both sides of the valve housing 110.

Moreover, the control unit 120 is mounted to the mounting space (S) of the valve housing 110, and controls the flow stream of the transmission oil, by selectively connecting the first inflow port 111 to the exhaust port 113 or the bypass port 115 and by selectively closing the exhaust port 113, while expanding or contracting depending on the temperature of the transmission oil flowing from the transmission 5.

The control unit 120 includes a sliding member 121, an end cap 127, a fixing rod 135, a deformable member 137, and a first elastic member 141.

One end of the sliding member 121 is open, a mounting part 122 protruding toward the inside upper part to form a hole is formed at the other end center or center portion, and at least one first opening hole 123 is formed on one side corresponding to the first inflow port 111 and the bypass port 115 along the length direction.

Furthermore, the sliding member 121 is formed with at least one second opening hole 125 on the other side corresponding to the second inflow port 117 and the exhaust port 113 along the length direction, and is inserted into the mounting space S of the valve housing 110 in a slidable manner.

Such a sliding member 121 can be formed in a cylindrical shape in which one end facing upward is open and the other end except the mounting part 122 is closed.

Here, the first opening hole 123*a* and the second opening hole 125*b* are formed at the top and bottom (or upper and lower portions) in the length direction of the sliding member 121 to be spaced apart from each other, and in the first and second opening holes 123 and 125*a* positioned at the top, the size of the first opening hole 123*a* can be formed to be greater than the size of the second opening hole 125*a*.

The end cap 127 is mounted to the open other end of the valve housing 110 to close the interior of the valve housing 110, and a fixing groove 129 is formed at the center or center portion thereof.

Here, the end cap 127 can be fixed to the valve housing 110 through a mounting ring 131 fixedly mounted to the interior circumferential surface of the open other end of the valve housing 110.

Moreover, the mounting ring 131 can be fixedly mounted through a ring groove 118 formed along the periphery of the interior circumferential surface of the open other end of the valve housing 110.

That is, the other end of the end cap 127 is supported through the mounting ring 131 mounted on the ring groove 118 in a state in which the one end of the end cap 127 is inserted into the open other end of the valve housing 110, and thus the end cap 127 is fixedly mounted to the valve housing 110.

Meanwhile, a seal ring 133 configured to prevent the transmission oil flowing into the valve housing 110 from leaking to the outside of the valve housing 110 can be mounted between the inflow of the valve housing 110 and the end cap 127.

That is, the seal ring 133 seals between the exterior circumferential surface of the end cap 127 and the interior circumferential surface of the valve housing 110 to prevent the transmission oil from leaking to the outside.

The fixing rod 135 is formed in or substantially in a circular rod shape, and one end thereof is fixed to the fixing groove 129 of the end cap 127.

Moreover, the deformable member 137 is inserted to the mounting part 122 of the sliding member 121, and the other end of the fixing rod 135 is inserted to the bottom of the deformable member 137.

Expansion or contraction is performed inside such a deformable member 137 depending on the temperature or the temperature change of the transmission oil, and the position thereof is varied through occurrence of linear displacement with the ascent or descent on the fixing rod 135 to selectively raise or lower the sliding member 121.

Here, the sliding member 121 can be fixed to the deformable member 137 through a fixing ring 139 that is mounted between the mounting part 122 and the deformable member 137 before the deformable member 137 inserted to the mounting part 122.

Meanwhile, in some embodiments, the deformable member 137 can include a wax material in which contraction and expansion are performed inside depending on the temperature of a working fluid such as transmission oil.

Here, the wax material is a material of which volume expands or contracts depending on the temperature and which has characteristics in which the volume expands therein when temperature increases, and then the volume contracts again when the temperature decreases and returns to an initial volume.

That is, the deformable member 137 is formed by an assembly including the wax material inside, and when the volume deformation of the wax material occurs inside depending on the temperature, the deformable member 137 can ascend or descend on the fixing rod 135, while an external form is not deformed.

Accordingly, when the transmission oil exceeding the predetermined temperature flows into the deformable member 137 through the first inflow port 111, as the volume thereof expands, the deformable member 137 raises the sliding member 121, while rising on the fixing rod 135 from the initial position mounted on the fixing rod 135.

Conversely, as described herein, when the transmission oil below the predetermined temperature flows in a state of expansion of volume, since the volume contracts, the deformable member 137 descends on the fixing rod 135 and returns the sliding member 121 to the initial position.

Furthermore, when the transmission oil below the predetermined temperature flows into the deformable member 137 in the initial state mounted to the fixing rod 135, since the expansion or contraction does not occur, the position is not varied.

Moreover, the first elastic member 141 is interposed between the sliding member 121 inside the valve housing 110, and when ascending or descending depending on the expansion and contraction of the deformable member 137, the first elastic member 141 is compressed or pulled to apply elastic force to the sliding member 121.

Here, in some embodiments, the first elastic member 141 can be formed by a coil spring, one end of which is supported on the inner side of the closed one end of the valve housing 110, and the other end of which is supported on the inner side of the other end of the sliding member 121.

Furthermore, the valve housing 110 is formed with a support groove 119 to which the first elastic member 141 is fixed in a supported state on the inner side of the one end, and the one end of the first elastic member 141 is stably supported through the support groove 119.

The operation of valve for a vehicle 100 configured as above will be described below referring to the accompanying FIGS. 5A and 5B.

Figure 5A:
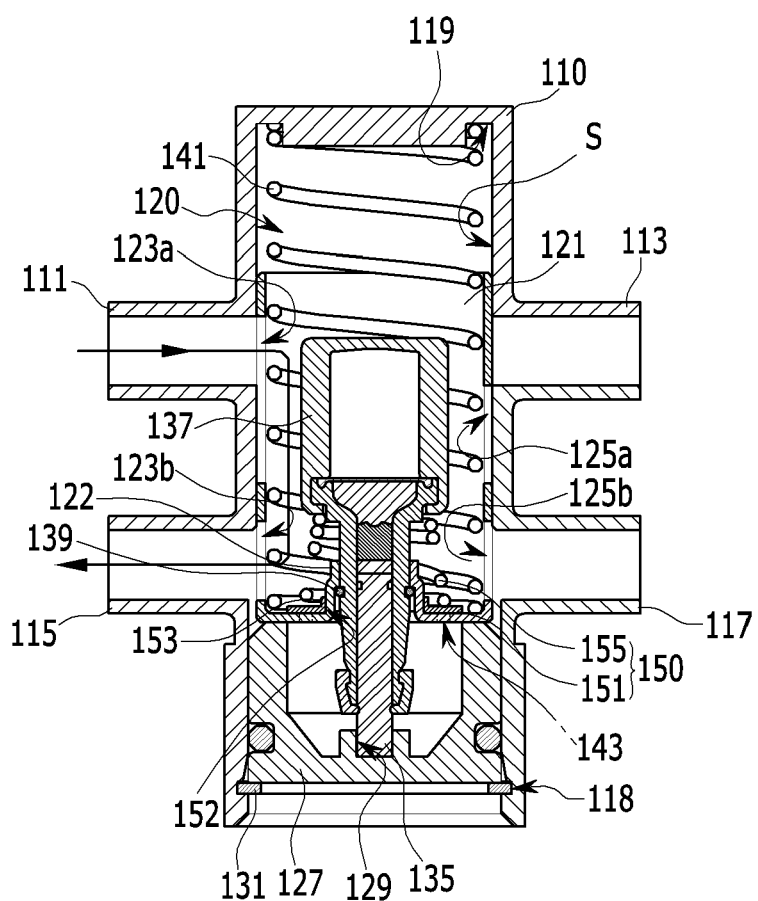
FIG. 5A and FIG. 5B are diagrams of a step-by-step operation state of an exemplary valve for a vehicle according to the present invention.
Figure 5B:
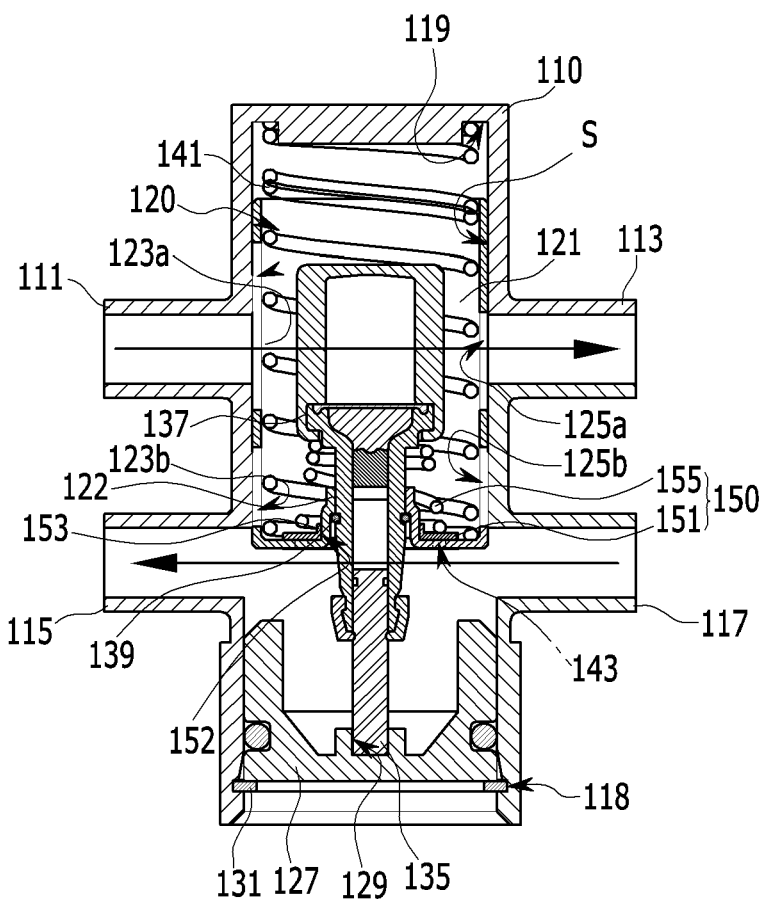

FIGS. 5A and 5B are diagram of a step-by-step operation state of the valve for a vehicle according to various embodiments of the present invention. As in FIG. 5A (S1), when the transmission oil flowing in through the first inflow port 111 is below the predetermined temperature, since the deformable member 137 is not deformed, the sliding member 121 maintains the initial mounting state.

In this case, first opening hole 123*a* of the sliding member 121 is located in the first inflow port 111 and the bypass port 115, thereby opening the first inflow port 111 and the bypass port 115.

Moreover, in the second opening holes 125*a* and 125*b*, the second opening hole 125 located at the top maintains the state of closure of the exhaust port 113 in the state of being located below the exhaust port 113, and the second opening hole 125*b* located at the bottom is located at the second inflow port 117 to keep the second inflow port 117 in an open state.

Accordingly, the transmission oil flowing into the first inflow port 111 from the transmission 5 flows into the transmission 5 again through the bypass port 115, as the exhaust port 113 maintains the closed state.

That is, the valve 100 for a vehicle according to various embodiments of the present invention is able to rapidly warm up the transmission 5, by allowing the transmission oil below the predetermined temperature flowed from the transmission 5 to bypass to the transmission 5 again through the bypass port 115, without cooling through the oil cooler 9 when the transmission oil is below the predetermined temperature.

Here, the cooled transmission oil exhausted from the oil cooler 9 flows through the open second inflow port 117, but since the transmission oil does not flow into the oil cooler 9 through the closed exhaust port 113, only a very small amount of transmission oil flows through the second inflow port 117, and flows into the transmission 5, together with the transmission oil allowed to bypass through the bypass port 115.

That is, the very small amount of cooled transmission oil flowed through the second inflow port 117 does not affect the temperature of the transmission oil allowed to bypass, and as the non-cooled transmission oil continuously bypasses and flows into the transmission 5, the warming of the transmission 5 can be more rapidly performed.

Thus, in the valve for a vehicle 100 according to various embodiments of the present invention, since the transmission 5 can be more rapidly warmed through the above-described operation, it is possible to improve the overall fuel efficiency of the vehicle by reducing the friction loss inside the transmission 5.

In contrast, as in FIG. 5B (S2), when the transmission oil flowing in through the first inflow port 111 exceeds the predetermined temperature, as the deformable member 137 expands and is deformed, the sliding member 121 ascends in the internal mounting space (S) of the valve housing 110.

Then, the bypass port 115 and the second inflow port 117 are maintained in the open state, and the first and second opening holes 123a and 125b located at the top are located in the first inflow port 111 and the exhaust port 113, thereby opening the first inflow port 111 and the exhaust port 113.

At this time, the transmission oil exceeding the predetermined temperature flowed through the first inflow port 111 flows into the oil cooler 9 through the exhaust port 113, and the transmission oil cooled through the heat exchange with the outside air in the oil cooler 9 flows in through the second inflow port 117, and flows into the transmission 5 through the bypass port 115.

Accordingly, the transmission oil cooled in the oil cooler 9 flows into the transmission 5 while overheated due to the temperature rise of the transmission oil to cool the transmission 5.

Meanwhile, when the sliding member 121 ascends by the deformable member 137 ascending along the fixing rod 135, the first elastic member 141 is in a state of being compressed between the valve housing 110 and the sliding member 121.

In such a state, when temperature of the transmission oil flowed through the first inflow port 111 falls below the predetermined temperature, the deformable member 137 descends on the fixing rod 135, while contracting and again being deformed to the initial state from the expansion state.

At this time, the sliding member 121 more rapidly descends to the initial position by elastic force of the first elastic member 141 of the compressed state, as in FIG. 5A (S1) as the initial mounting state, thereby closing the open exhaust port 113.

Meanwhile, in some embodiments, the sliding member 121 is formed with at least one relief hole 143 that is formed at a position spaced apart from the mounting part 122 on the other end formed with the mounting part 122.

Such relief holes 143 can be formed at positions spaced apart from each other at a predetermined angle along the circumferential direction around the mounting part 122, and in some embodiments, four relief holes 143 are formed at positions spaced apart from each other around the mounting part 122 at an angle of 90°.

Meanwhile, in some embodiments, the four relief holes 143 formed at the positions spaced from each other along the circumferential direction around the mounting part 122 at the angle of 90° are described as an exemplary embodiment, but the present invention is not limited thereto, and the size, the number, and the positions of the relief holes 143 can be modified and applied.

In some embodiments, a pressure control unit 150 can be provided between the sliding member 121 and the deformable member 137. The pressure control unit 150 selectively opens and closes the relief hole 143 to control the internal pressure of the valve housing 110, when differential pressure occurs by the cooled transmission oil flowed from the oil cooler 9 inside the valve housing 110.

The pressure control unit 150 is configured to include an opening and closing member 151 that is disposed inside the other end of the sliding member 121 so to be able to ascend and descend to correspond to the relief hole 143, and a second elastic member 155 that is disposed between the opening and closing member 151 and the deformable member 137 inside the sliding member 121 and that applies elastic force to the opening and closing member 151.

The opening and closing member 151 is formed, for example, in a disk shape with a penetration hole 152 at the center or center portion to correspond to the mounting part 122, and can be mounted to the inside of the other end of the sliding member 121 in the state of being inserted into the mounting part 122 through the penetration hole 152.

Furthermore, the opening and closing member 151 can be integrally or monolithically formed with a protrusion 153 that protrudes toward the second elastic member 155 from the interior circumferential surface of the penetration hole 152.

Such a protrusion 153 guides the opening and closing member 151 so as to stably ascend and descend along the mounting part 122, when the differential pressure occurs depending on the flow rate of the transmission oil flowed from the oil cooler 9 in the valve housing 110 or the generated differential pressure is released and the opening and closing member 151 ascends or descends.

Meanwhile, in some embodiments, the second elastic member 155 can be formed by a coil spring, one end of which is supported by the deformable member 137, and the other end of which is supported by the opening and closing member 151.

Hereinafter, the operation of the pressure control unit 150 as configured above will be described referring to FIGS. 6A and 6B.

Figure 6A:
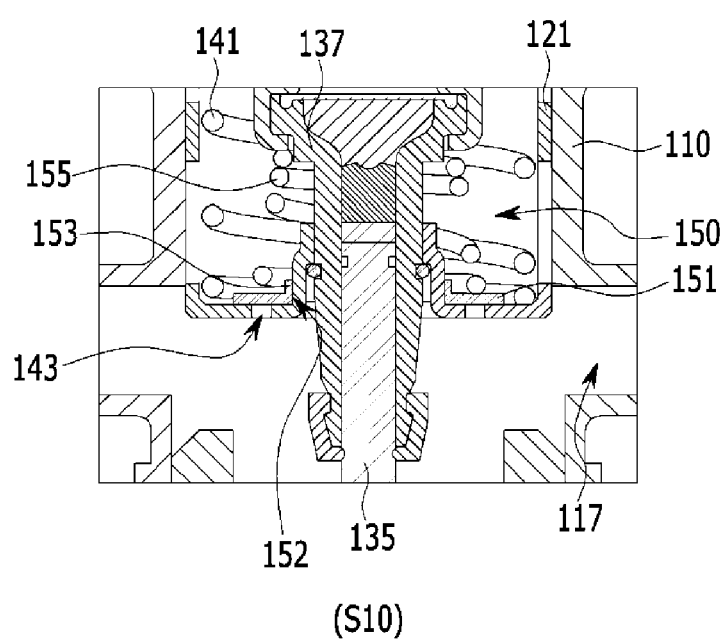
FIG. 6A and FIG. 6B are diagrams of a step-by-step operation state of an exemplary pressure control unit applied to an exemplary valve for a vehicle according to the present invention.
Figure 6B:
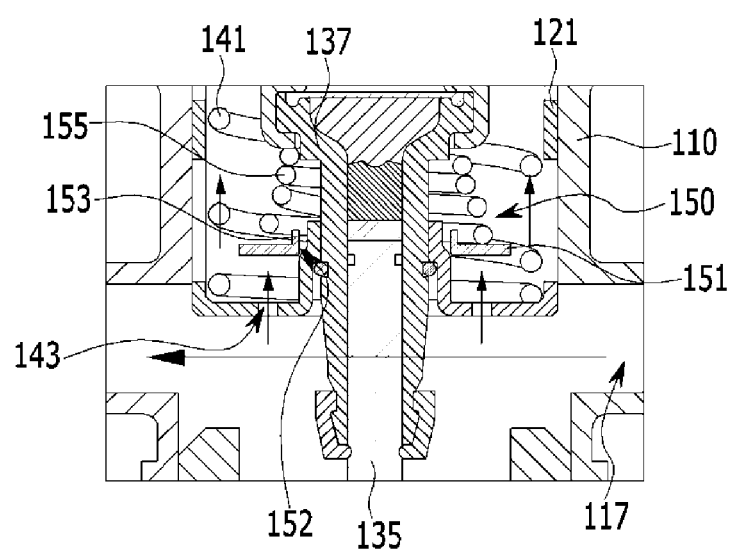

FIGS. 6A and 6B are diagrams of a step-by-step operation state of the pressure control unit that is applied to the valve for a vehicle according to various embodiments of the present invention. Referring to FIGS. 6A and 6B, the pressure control unit 150 is selectively operated in a state in which the second inflow port 117 and the bypass port 115 are open, as the sliding member 121 ascends by the expansion deformation of the deformable member 137.

First, when the transmission oil cooled through the open second inflow port 117 in the oil cooler 9 flows into the valve housing 110, if the flow rate is low, the pressure difference inside valve housing 110 does not occur between the top in which the sliding member 121 is located and the bottom of the sliding member 121.

Accordingly, as in FIG. 6A (S10), the pressure control unit 150 maintains the initial mounting state in which the relief hole 143 is closed.

In contrast, when the flow rate of the cooled transmission oil flowed from the oil cooler 9 through the second inflow port 117 increases, and the pressure difference inside the valve housing 110 occurs between the top in which the sliding member 121 is located and the bottom of the sliding member 121, as in FIG. 6B (S20), the opening and closing member 151 ascends by the pressure of the transmission oil due to the generated differential pressure to open the relief holes 143.

Then, a part of the cooled transmission oil flowed through the second inflow port 117 flows into the sliding member 121 through the open relief hole 142, thereby eliminating the pressure difference inside the valve housing 110 that is located inside the sliding member 121 and below the sliding member 121.

Furthermore, when the differential pressure inside the valve housing 110 is eliminated, the opening and closing member 151 of the pressure control unit 150 is rapidly lowered by elastic force of the second elastic member 155 that is compressed during ascent of the opening and closing member 151 and returned to the initial mounting state again, thereby again closing the relief holes 143 as in FIG. 6A (S10).

That is, through the above-described or similar operation, the valve 100 eliminates the pressure difference caused by the difference in flow rate of the transmission oil flowing into the valve housing 110 from the transmission 5 and the oil cooler 9, by the operation of the relief hole 142 and the pressure control unit 150, and thus it is possible to improve the overall pressure resistance and durability of the valve 100 and to improve reliability and responsiveness of the valve operation.

Therefore, when applying the valve for a vehicle 100 according to various embodiments of the present invention, by being provided between the oil cooler 9 for cooling the transmission oil and the transmission 5 in a simple structure, and by controlling the flow stream of the transmission oil so as to allow the transmission oil to bypass or to flow in the oil cooler, while being rapidly expanded or contracted depending on the temperature of the transmission oil, it is possible to simplify the assembly through the simplification of the constituent elements and reduce the manufacturing cost.

Furthermore, it is possible to increase the flow rate by securing the bypass flow passage as compared to the related art, by preventing the transmission oil cooled by the oil cooler 9 from leaking to the transmission 5 in advance, it is possible to secure reliability of the flow stream control depending on the temperature of the transmission oil, and it is possible to improve the overall fuel efficiency of the vehicle by reducing the friction loss in the transmission 5 through the rapid warming of the transmission oil.

Furthermore, when the transmission oil bypasses, it is possible to reduce the required power of a hydraulic pump through an increase in flow rate, and by assembling the internal constituent elements to the valve housing 110 later, the internal constituent elements can be replaced after failure, so that it is possible to reduce the maintenance cost and improve convenience of the replacement work.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A valve for a vehicle provided between a transmission and an oil cooler for cooling transmission oil, the valve comprising:
    a valve housing in which, on both sides and facing each other, a first inflow port connected to the transmission and an exhaust port connected to the oil cooler are formed, and on the both sides and facing each other at a position spaced apart from the first inflow port and the exhaust port along a length direction of the valve housing, a bypass port connected to the transmission and a second inflow port connected to the oil cooler are formed; and
    a control unit that includes a deformable member, is mounted inside the valve housing, and selectively connects the first inflow port to the exhaust port or the bypass port while expansion or contraction of the deformable member is performed depending on a temperature of the transmission oil, and selectively closes the exhaust port to control a flow stream of the transmission oil,
    wherein the valve housing is configured so that a first end of the valve housing is closed and a second end thereof is open, and a mounting space connected to the first and second inflow ports, the exhaust port, and the bypass port is formed therein,
    wherein the control unit includes:
        a sliding member in which a first end is open and a mounting part is formed at a center portion of a second end, at least one first opening hole is formed on a first side corresponding to the first inflow port and the bypass port along a length direction of the sliding member, and at least one second opening hole is formed on a second side corresponding to the second inflow port and the exhaust port along the length direction of the sliding member, and wherein the sliding member is inserted to be slidable inside the valve housing;
        an end cap that is mounted to the second end of the valve housing, closes an interior of the valve housing, and is formed with a fixing groove at a center portion of the end cap;
        wherein the deformable member is inserted into the mounting part of the sliding member and selectively raises or lowers the sliding member, while ascending or descending on a fixing rod when expansion or contraction is performed inside the deformable member depending on the temperature of the transmission oil;
        wherein, one end of the fixing rod is fixed to the fixing groove of the end cap, and the other end is inserted into a bottom of the deformable member; and
        a first elastic member that is interposed between the sliding member and the valve housing and that applies elastic force to the sliding member, while being compressed or pulled depending on the expansion or contraction of the deformable member,
    wherein the at least one first opening hole includes a plurality of first opening holes that are separately formed at upper and lower portions of the sliding member in the length direction of the sliding member,
wherein the at least one second opening hole includes a plurality of second opening holes that are separately formed at the upper and lower portions of the sliding member in the length direction of the sliding member, and
wherein a first opening hole from the plurality of first opening holes is formed at the upper portion of the sliding member and has a size that is greater than that of a second opening hole from the plurality of second opening holes formed at the upper portion of the sliding member.

2. The valve for a vehicle of claim 1, wherein the first inflow port is formed on one of the both sides of the valve housing at a position diagonal to the second inflow port, wherein the second inflow port is formed on the other of the both sides of the valve housing.

3. The valve for a vehicle of claim 1, wherein the sliding member is formed in a cylindrical shape that is open at one end.

4. The valve for a vehicle of claim 1, wherein the sliding member is configured such that when the deformable member is not deformed, the plurality of the first opening holes are positioned in accordance with the first inflow port and the bypass port, the second opening hole formed at the upper portion of the sliding member is positioned below the exhaust port, and another second opening hole of the plurality of second opening holes formed at the lower portion of the sliding member is positioned in accordance with the second inflow port.

5. The valve for a vehicle of claim 1, wherein the sliding member ascends inside the valve housing and maintains the bypass port and the second inflow port in an open state at a time of expansion deformation of the deformable member, and the first and second opening holes formed at the upper portion of the sliding member are positioned in accordance with the first inflow port and the exhaust port to open the first inflow port and the exhaust port.

6. The valve for a vehicle of claim 1, wherein the sliding member is fixed to the deformable member through a fixing ring that is mounted between the mounting part and the deformable member before the deformable member is inserted to the mounting part.

7. The valve for a vehicle of claim 1, wherein the end cap is fixed to the valve housing through a mounting ring that is fixedly mounted to an interior circumferential surface of the second end of the valve housing.

8. The valve for a vehicle of claim 7, wherein the mounting ring is fixedly mounted through a ring groove formed along a periphery of the interior circumferential surface of the second end of the valve housing.

9. The valve for a vehicle of claim 1, wherein, between the valve housing and the end cap, a seal ring that prevents the transmission oil flowing into the valve housing from leaking to an outside of the valve housing is mounted.

10. The valve for a vehicle of claim 1, wherein the first elastic member is formed of a coil spring, a first end of which is supported on an inner side of the first end of the valve housing, and a second end of which is supported on an inner side of the second end of the sliding member.

11. The valve for a vehicle of claim 1, wherein the valve housing is formed with a support groove, in which the first elastic member is fixed in a supported state, on an inner side of the first end of the valve housing.

12. The valve for a vehicle of claim 1, wherein the sliding member is formed with at least one relief hole that is formed at a position spaced apart from the mounting part at the second end of the sliding member in which in which the mounting part is formed.

13. The valve for a vehicle of claim 12, wherein the at least one relief hole includes a plurality of relief holes that are formed at positions spaced apart from each other at a predetermined angle along a circumferential direction around the mounting part.

14. The valve for a vehicle of claim 12, wherein, between the sliding member and the deformable member, a pressure control unit is provided which selectively opens or closes the at least one relief hole when a differential pressure occurs by the transmission oil flowed inside the valve housing.

15. The valve for a vehicle of claim 14, wherein the pressure control unit includes:
an opening and closing member that is disposed inside the second end of the sliding member to correspond to the at least one relief hole; and
a second elastic member that is interposed between the opening and closing member and the deformable member inside the sliding member, and applies elastic force to the opening and closing member.

16. The valve for a vehicle of claim 15, wherein the opening and closing member is formed in a disk shape having a penetration hole formed at a center portion to correspond to the mounting part.

17. The valve for a vehicle of claim 16, wherein the opening and closing member is integrally formed with a protrusion that protrudes toward the second elastic member from an interior circumferential surface of the penetration hole.

18. The valve for a vehicle of claim 15, wherein the second elastic member is formed of a coil spring, a first end of which is supported by the deformable member, and a second end of which is supported by the opening and closing member.

19. The valve for a vehicle of claim 1, wherein the deformable member includes a wax material that contracts and expands inside the deformable member on the temperature of the transmission oil.

* * * * *